April 24, 1973     G. R. SHAFFER ET AL     3,729,382
MICROORGANISM SAMPLING DISH
Filed Dec. 9, 1970
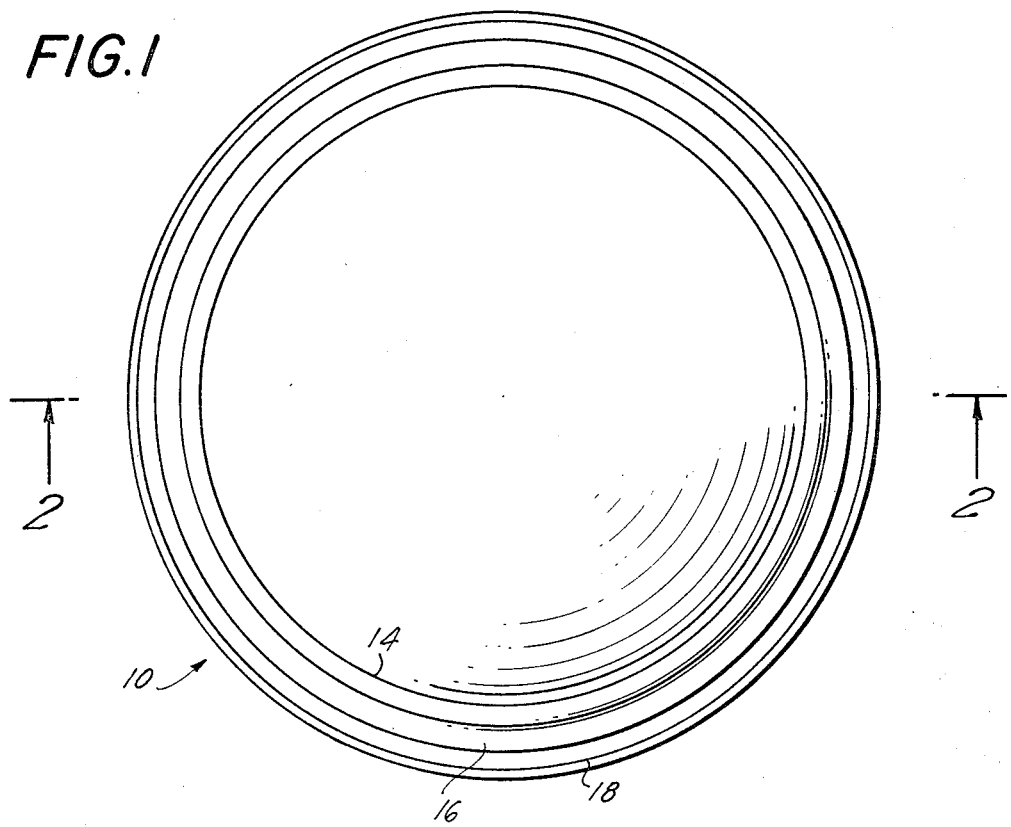
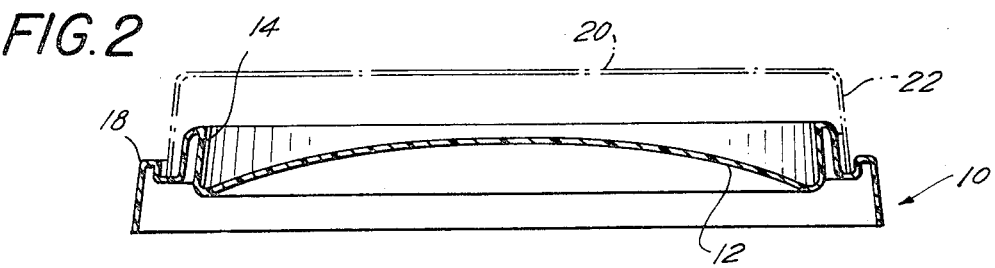
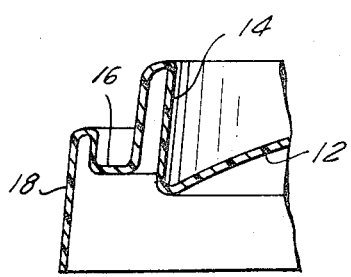
INVENTORS
G. RAYMOND SHAFFER
EUGENE M. ROZ
BY
ATTORNEYS United States Patent Office 3,729,382
Patented Apr. 24, 1973

3,729,382
MICROORGANISM SAMPLING DISH
George Raymond Shaffer, Townson, and Eugene M. Roz, Middle River, Md., assignors to Becton, Dickinson and Company, Rutherford, N.J.
Filed Dec. 9, 1970, Ser. No. 96,306
Int. Cl. C12b 1/00
U.S. Cl. 195—139     3 Claims

ABSTRACT OF THE DISCLOSURE

A microorganism sampling dish for testing a surface for the presence of microorganisms has a base plate formed with an inwardly sloping wall extending therearound at the periphery of the plate. The dish is formed from flexible material and has a convex bottom. A channel is spaced about the dish wall for supporting a cover. A culture medium can be disposed in the dish and a cover may be provided which bridges the dish wall and culture medium and rests in the channel.

BACKGROUND OF THE INVENTION

The invention relates to an improved microorganism sampling dish. In particular, it relates to an improved culture dish especially useful in protecting a moist culture medium during storage and transfer.

It is necessary or useful to check various surfaces for the presence, absence or identification of microorganisms. Checks of this type are made of the walls, floors and ceilings of hospital rooms, laboratories, sterile rooms, food processors, restaurants, operating tables, as well as the counters and benches of laboratories, sterile production rooms and other similar surfaces.

It is highly desirable to deposit a sample of the surface to be tested directly in a culture medium spaced within a culture dish in order to eliminate the necessity of preserving the sample in a sterile condition and to eliminate he danger of losing and/or contaminating all or a part of the sampling with microorganisms from other sources. A satisfactory sampling device is disclosed in U.S. Pat. No. 3,203,870.

While sampling devices similar to that disclosed in U.S. Pat. No. 3,203,870 have provided satisfactory results, a need has developed to provide a sampling dish with additional safeguards. It has been observed that fresh nutrient beds stored in conventional sampling devices can overflow the end walls of the dishes as a result of mishandling during shipment. Further, upon shrinkage, the bed can separate from the bottom of the sampling dish, thereby permitting undesired movement relative to the dish. Additionally, it has been noted that in storage the nurient bed tends to dry somewhat such that the bed is reduced in height to be below the outer rim of the sampling dish. This phenomenon makes it difficult to transfer a sample from the surface to be tested to the culture medium by impressing the disk against the surface being tested. An apparatus for the cultivation of microorganisms subject to these defects is disclosed in U.S. Pat. No. 2,701,229.

SUMMARY OF THE INVENTION

It is, therefore, a primary object of this invention to provide an improved sampling device for testing surfaces for the presence, absence or identification of microorganisms which is adapted to counteract the shrinkage of a freshly prepared nutrient medium spaced therein.

It is a further object of the invention to provide a novel culture dish of improved construction which provides enhanced stability for a freshly prepared culture medium during shipment to reduce the hazard of overflow.

The above and other objects are met in an improved culture dish having a base plate and an upstanding inwardly sloping wall extending continuously thereabout. The inward sloping wall holds the culture medium in place, since the width of the bottom of the culture medium emplaced therein is greater than the width of the top edge of he culure medium.

To reduce shrinkage of the culture medium away from the side wall and base plate of the culture dish, a convex base plate is provided. As the culture medium shrinks, the concavity of its undersurface increases. However, this tendency is met by the matching convexity of the base plate. It is, therefore, a feature of the invention that, as the culture medium dries and displays a tendency to shrink away from the dish, a vacuum effect is produced on the bottom face of the medium bed owing to convex shape of the dish bottom. This effect tends to hold the bed tightly against the base of the dish. While in certain prior art devices there was a tendency for the bed to loosen, change shape or become otherwise distorted during storage or shipment, such tendency can be significantly reduced, if not eliminated, by the present novel design.

The culture dish is formed of flexible material. By providing a flexible dish, the culture medium can be forced upwardly as the dish is compressed and into contact with the surface to be examined. Some shrinkage has usually occurred upon storage and the bed is reduced in hight to be below the rim of the dish. In general, prior art devices were formed of rigid materials with little, if any, flexibility.

The culture dish is provided with cover supporting means surrounding the upstanding wall. A cover for the dish is provided with a top plate and with depending walls which surround and overlap the inwardly sloping upstanding wall of the dish. The depending walls of the cover are supported by the supporting means. The depending wall of the cover is of greater hight than the upstanding wall of the dish so that the top plate of the cover bridges over and is spaced above the wall of the dish. When used as a microorganism sampling device, the dish is filled with a relatively stiff self-supporting culture medium which projects above the level of the upstanding walls of the dish. Thus, the dish can be manipulated to impress the culture medium against the surface to be sampled. Should the surface of the medium be below the level of the dish wall, the dish wall can be inwardly compressed and/or an upward force can be exerted on the base plate to impress the culture medium against the test surface. When the cover is supplied to the dish, it not only bridges the upstanding walls of the dish but is also spaced above the culture medium. Thus the sampling may be taken directly in the culture medium of the culture dish, the cover applied thereto and thereafter the assembly can be placed in the suitable thermal environment for the microorganisms being checked or tested.

In the accompanying drawing:

FIG. 1 is a top plan view of a microorganism sampling device embodying the invention in the form of a culture dish;

FIG. 2 is a cross-sectional view of the assembly in the direction of the arrows on the line 2—2 of FIG. 1; and FIG. 3 is a fragmentary perspective view partially in section on an enlarged scale illustrating the cover supporting channel and inwardly sloping walls of the culture dish.

DESCRIPTION OF THE PREFERRED EMBODIMENTS

The improved microorganism sampling dish comprises generally a culture dish 10. The dish may be made of any suitable flexible material such as a plastic or resin material inert to and unaffected by the culture medium employed therein and the microorganisms to be tested and cultured therein. Preferably the culture dish is vacuum formed employing flexible plastic sheet material. Suitable plastic materials including flexible polypropylene, flexible polyethylene and other plastics with suitable flexibility.

The culture dish 10 comprises generally a base plate 12 which is preferably convex with respect to the bottom edge of the dish; that is the base plate is centrally arched within the side walls of the dish, and, in the illustrated embodiment, is of circular configuration. An inwardly sloping upstanding wall 14 extends continuously around the dish adjacent the periphery thereof and, as shown, is preferably formed integrally with the base plate. The upstanding wall 14 is preferably shaped as a frustum of a cone, with the smaller radius at the top.

A suitable cover supporting means, preferably in the form of the upwardly facing channel portion 16, is provided. Surrounding the dish and depending downwardly from the channel portion thereof is the rim 18, which may serve as a handle for gripping and manipulating the culture dish so that it can be readily impressed against a surface which is to be sampled.

The surface of a culture dish may be provided with suitable lines or a grid, not shown, so as to facilitate counting of the microorganisms in the usual manner.

A cover member is provided for the novel culture dish comprising a relatively flat top plate 20 (shown in phantom lines) with a depending wall 22 extending about the periphery thereof and formed integrally therewith. The depending side wall 22 of the cover member is of such a size and configuration that it surrounds and overlaps the upstanding wall 14 and rests in and is supported by the upwardly facing channel 16 of the cover dish. In addition, the depending wall 22 of the cover member is of somewhat greater height than the upstanding wall 14 of the culture dish so that the top plate 20 of the cover member bridges over and is spaced above the upstanding wall 14. In this connection, the height of the depending wall 22 of the cover member should be such that the top plate 20 also bridges over and is spaced above the culture medium in the culture dish. Thus, in assembling the cover member with the culture dish the lower end of the wall of the cover member is arranged in overlapping relationship with the upstanding wall 14 of the culture dish, with the lower end of the wall 22 being disposed in the channel 16.

When using the device, a suitable sealant may be applied to the channel or the lower edge of the cover wall, such as silicone resin or petroleum jelly.

In order to provide the desired culture medium, any base material of a gelatinous nature, such as agar or silica gel or gelatin may be employed. Suitable nutrient materials may be mixed therewith, such as meat infusion, beef serum, a carbohydrate such as dextrose or glucose and also other suitable materials such as peptone, proteose, potassium phosphate, thiamin, yeast extract and the like.

Modifications may be made in the illustrated and described embodiment of the invention without departing from the invention as set forth in the accompanying claims.

I claim:

1. A microorganism sampling dish for testing a surface for the presence of microorganism comprising a base plate and an upwardly extending side wall integrally connected thereto, the base plate being substantially circular in configuration and being upwardly arched defining a convex configuration within the side wall, the side wall sloping inwardly relative to the juncture between it and the base plate and extending continuously therearound in completing the receptacle for the culture medium, the convex base plate and the reduced diameter of the upper periphery of the side wall cooperating in maintaining the culture medium in place within the receptacle.

2. The invention in accordance with claim 1, wherein the culture dish is formed from a flexible material inert to and unaffected by the culture medium employed therein and the microorganisms to be tested and cultured therein.

3. The invention in accordance with claim 1, wherein means extend from the side wall to support a cover for the dish.

References Cited

UNITED STATES PATENTS

| | | | |
|---|---|---|---|
| 3,203,870 | 8/1965 | Andelin | 195—139 |
| 2,677,647 | 5/1954 | Lovell | 195—139 |

ALVIN E. TANENHOLTZ, Primary Examiner